United States Patent
Rong et al.

(10) Patent No.: US 10,205,573 B2
(45) Date of Patent: Feb. 12, 2019

(54) SYSTEM AND METHOD FOR OFDMA PS-POLL TRANSMISSION

(71) Applicant: Futurewei Technologies, Inc., Plano, TX (US)

(72) Inventors: Zhigang Rong, San Diego, CA (US); Younghoon Kwon, San Diego, CA (US); Yunsong Yang, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 96 days.

(21) Appl. No.: 14/478,756

(22) Filed: Sep. 5, 2014

(65) Prior Publication Data

US 2015/0078352 A1    Mar. 19, 2015

Related U.S. Application Data

(60) Provisional application No. 61/877,726, filed on Sep. 13, 2013.

(51) Int. Cl.
*H04J 3/16* (2006.01)
*H04L 1/00* (2006.01)
(Continued)

(52) U.S. Cl.
CPC .............. *H04L 5/0053* (2013.01); *H04J 3/16* (2013.01); *H04L 1/00* (2013.01); *H04L 5/0094* (2013.01);
(Continued)

(58) Field of Classification Search
CPC ... H04W 4/08; H04W 8/186; H04W 28/0263; H04W 28/06; H04W 48/10;
(Continued)

(56) References Cited

U.S. PATENT DOCUMENTS 7,499,418 B2 * 3/2009 Oprescu-Surcobe ........................ H04W 68/02 370/311
8,432,854 B2 * 4/2013 Cordeiro ............... H04W 48/08 370/328

(Continued)

FOREIGN PATENT DOCUMENTS

CN         1953387 A      4/2007
CN       101754102 A      6/2010
(Continued)

OTHER PUBLICATIONS

International Search Report and Written Opinion, International Application No. PCT/CN2014/086471, Applicant: Huawei Technologies Co., Ltd., dated Dec. 14, 2014, 11 pages.
(Continued)

*Primary Examiner* — Eric Nowlin
(74) *Attorney, Agent, or Firm* — Daniel J. Burns

(57) ABSTRACT

A method for communicating in a wireless system includes receiving a trigger frame including a paging bitmap, and resource allocation information indicating a location of a resource pool for transmitting a packet, and determining if the station is permitted to transmit the packet in accordance with the paging bitmap. If the station is permitted to transmit the packet, the method also includes determining a location of a network resource in the resource pool in accordance with an identifier of the station, and transmitting the packet at the location of the network resource.

17 Claims, 13 Drawing Sheets

(51) Int. Cl.
*H04L 5/00* (2006.01)
*H04W 52/02* (2009.01)
*H04W 72/04* (2009.01)

(52) U.S. Cl.
CPC ..... *H04W 52/0216* (2013.01); *H04W 72/042* (2013.01); *Y02D 70/1262* (2018.01); *Y02D 70/142* (2018.01)

(58) Field of Classification Search
CPC ......... H04W 52/0206; H04W 52/0216; H04W 52/0219; H04W 52/545; H04W 68/00; H04W 68/005; H04W 68/02; H04W 68/025; H04W 72/04; H04W 72/042; H04W 72/0446; H04W 72/1263; H04W 72/1289; H04W 74/006; H04W 74/04; H04W 74/048; H04W 74/06; H04W 76/048; H04W 84/12; H04W 84/18; H04W 56/00; H04L 1/007; H04L 1/1614; H04L 5/0092; H04L 29/0653
See application file for complete search history.

(56) References Cited

U.S. PATENT DOCUMENTS

| | | | | |
|---|---|---|---|---|
| 8,666,433 | B2* | 3/2014 | Cho | G01S 5/02 455/456.1 |
| 8,718,030 | B2* | 5/2014 | Krasnyanskiy | G06F 17/30961 370/336 |
| 8,917,743 | B2* | 12/2014 | Zhu | H04W 72/042 370/445 |
| 9,398,576 | B2* | 7/2016 | Calcev | H04W 72/042 |
| 9,467,943 | B2* | 10/2016 | Jeong | H04W 52/0222 |
| 9,516,674 | B2* | 12/2016 | Seok | H04W 4/70 |
| 9,544,848 | B2* | 1/2017 | Jafarian | H04W 52/0229 |
| 9,560,630 | B2* | 1/2017 | Merlin | H04W 68/02 |
| 9,560,632 | B2* | 1/2017 | Merlin | H04W 68/025 |
| 9,585,057 | B2* | 2/2017 | Seok | H04W 28/06 |
| 9,628,243 | B2* | 4/2017 | Zheng | H04L 1/1685 |
| 9,706,577 | B2* | 7/2017 | Ghosh | H04W 74/0833 |
| 9,729,214 | B2* | 8/2017 | Chu | H04J 11/00 |
| 9,756,659 | B2* | 9/2017 | Seok | H04W 74/002 |
| 9,781,627 | B2* | 10/2017 | Merlin | H04W 28/0273 |
| 9,801,208 | B2* | 10/2017 | Seok | H04W 74/04 |
| 9,807,804 | B2* | 10/2017 | Kwon | H04W 74/0891 |
| 9,838,940 | B2* | 12/2017 | Barriac | H04W 74/006 |
| 9,844,037 | B2* | 12/2017 | Seok | H04W 74/0816 |
| 9,930,552 | B2* | 3/2018 | Tian | H04W 24/10 |
| 2005/0047386 | A1 | 3/2005 | Yi | |
| 2006/0251033 | A1* | 11/2006 | Oprescu-Surcobe | H04W 68/02 370/338 |
| 2007/0259672 | A1* | 11/2007 | Heo | H04W 72/042 455/452.2 |
| 2007/0274288 | A1* | 11/2007 | Smith | H04L 5/0092 370/351 |
| 2008/0186886 | A1 | 8/2008 | Cho et al. | |
| 2009/0154418 | A1* | 6/2009 | Kang | H04W 72/042 370/329 |
| 2010/0067428 | A1* | 3/2010 | Cordeiro | H04W 48/08 370/315 |
| 2011/0223942 | A1* | 9/2011 | Xu | H04W 68/00 455/458 |
| 2011/0268056 | A1* | 11/2011 | Soong | H04W 72/0406 370/329 |
| 2012/0082037 | A1* | 4/2012 | Wang | H04W 68/025 370/241 |
| 2012/0087358 | A1* | 4/2012 | Zhu | H04W 74/0816 370/338 |
| 2013/0059602 | A1* | 3/2013 | Cho | G01S 5/02 455/456.1 |
| 2013/0142184 | A1* | 6/2013 | Wang | H04L 5/0053 370/338 |
| 2013/0208667 | A1* | 8/2013 | Merlin | H04W 68/02 370/329 |
| 2013/0210467 | A1* | 8/2013 | Kim | H04W 68/02 455/458 |
| 2013/0229963 | A1 | 9/2013 | Asterjadhi et al. | |
| 2013/0301605 | A1* | 11/2013 | Kim | H04L 1/00 370/330 |
| 2014/0071900 | A1* | 3/2014 | Park | H04W 74/04 370/329 |
| 2014/0146678 | A1* | 5/2014 | Merlin | H04W 68/025 370/235 |
| 2014/0169290 | A1* | 6/2014 | Seok | H04W 4/70 370/329 |
| 2015/0003367 | A1* | 1/2015 | Seok | H04W 74/002 370/329 |
| 2015/0009879 | A1 | 1/2015 | Kim | |
| 2015/0049701 | A1* | 2/2015 | Tian | H04W 24/10 370/329 |
| 2015/0078299 | A1* | 3/2015 | Barriac | H04W 74/006 370/329 |
| 2015/0110061 | A1* | 4/2015 | Park | H04W 74/04 370/329 |
| 2015/0117364 | A1* | 4/2015 | Asterjadhi | H04L 5/003 370/329 |
| 2015/0131640 | A1* | 5/2015 | Seok | H04W 28/06 370/338 |
| 2015/0139119 | A1* | 5/2015 | Azizi | H04W 72/1278 370/329 |
| 2015/0237623 | A1* | 8/2015 | Choi | H04W 72/0446 370/329 |
| 2015/0244619 | A1* | 8/2015 | Zheng | H03M 13/09 370/392 |
| 2015/0245292 | A1* | 8/2015 | Jeong | H04W 52/0222 370/311 |
| 2015/0249529 | A1* | 9/2015 | Zheng | H04L 1/1685 370/336 |
| 2015/0327276 | A1* | 11/2015 | Rebeiz | H04W 72/0493 370/329 |
| 2015/0365895 | A1* | 12/2015 | Lee | H04W 52/0216 370/311 |
| 2015/0365916 | A1* | 12/2015 | Wang | H04W 68/025 370/329 |
| 2016/0028452 | A1* | 1/2016 | Chu | H04J 11/00 375/267 |
| 2016/0029373 | A1* | 1/2016 | Seok | H04L 5/0055 370/338 |
| 2016/0127096 | A1* | 5/2016 | Lee | H04W 72/0453 375/267 |
| 2016/0143026 | A1* | 5/2016 | Seok | H04W 72/0413 370/329 |
| 2016/0165574 | A1* | 6/2016 | Chu | H04L 5/0007 370/312 |
| 2016/0165589 | A1* | 6/2016 | Chu | H04L 5/0007 370/329 |
| 2016/0173377 | A1* | 6/2016 | Rong | H04W 74/04 370/392 |
| 2016/0286533 | A1* | 9/2016 | Ghosh | H04L 5/0007 |
| 2016/0302232 | A1* | 10/2016 | Ghosh | H04W 74/0833 |
| 2016/0335147 | A1* | 11/2016 | Asterjadhi | G06F 11/0709 |
| 2016/0338047 | A1* | 11/2016 | Seok | H04B 7/2643 |
| 2016/0345358 | A1* | 11/2016 | Seok | H04W 74/04 |
| 2016/0353414 | A1* | 12/2016 | Choi | H04W 4/70 |
| 2017/0070973 | A1* | 3/2017 | Merlin | H04W 68/02 |
| 2017/0150438 | A1* | 5/2017 | Merlin | H04W 52/0209 |
| 2017/0208547 | A1* | 7/2017 | Choi | H04W 72/121 |
| 2017/0280383 | A1* | 9/2017 | Park | H04W 52/02 |
| 2017/0317728 | A1* | 11/2017 | Choi | H04L 1/1614 |
| 2017/0338867 | A1* | 11/2017 | Chu | H04J 11/00 |
| 2018/0092132 | A1* | 3/2018 | Kwon | H04W 74/0891 |
| 2018/0124804 | A1* | 5/2018 | Yao | H04W 72/12 |

FOREIGN PATENT DOCUMENTS

CN 102013959 A 4/2011
JP 2005124159 A 5/2005

(56) References Cited

FOREIGN PATENT DOCUMENTS

| WO | 2007/052888 A2 | 5/2007 |
|---|---|---|
| WO | 2013/115464 A1 | 8/2013 |
| WO | 2013/122424 A1 | 8/2013 |

OTHER PUBLICATIONS

Cariou, L. et al., "High-efficiency WLAN," IEEE 802.11-13/0331r5, Mar. 19, 2013, 21 pages.
Cariou, L., et al., "High-efficiency WLAN Straw poll," IEEE 802.11-13/r10, Mar. 19, 2013, 7 pages.
Supplementary European Search Report for EP 14844165, dated Jul. 14, 2016. 4 pages.
Minyoung Park et al., "RAW Slot Assignment Name Affiliations Address Phone email," https://mentor.ieee.org/802.11/dcn/12/11-12-1321-00-00ah-raw-slot-assignment.ppt. Nov. 12, 2012. 14 pages.
Minyoung Park et al., "RAW Slot Assignment follow up," Document IEEE 802.11-12/1321r0. Mar. 18, 2013. 10 pages.
Park, M., "Specification Framework for TGah," IEEE 802.11-11/1137r15, May 14, 2013. Total 10 pages.

\* cited by examiner

US 10,205,573 B2

SYSTEM AND METHOD FOR OFDMA PS-POLL TRANSMISSION

This application claims the benefit of U.S. Provisional Application No. 61/877,726, filed on Sep. 13, 2013, entitled "System and Method for OFDMA PS-Poll Transmission," which application is hereby incorporated herein by reference.

TECHNICAL FIELD

The present invention relates to digital communications, and, in particular embodiments, to orthogonal frequency division multiple access (OFDMA) PS-poll transmission.

BACKGROUND

The number of devices using Wireless Local Area Networks (WLAN) continue to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, the density of devices in the WLANs (e.g., access points (APs) and stations (STA)) will also increase. High densities of APs (also commonly referred to as communications controller, controller, and the like) and stations (also commonly referred to as user, subscriber, terminal, and the like) tend to make WLANs less efficient, especially since the original WLANs were designed assuming a low density of APs and stations. As an example of inefficiency, a currently used enhanced distributed channel access (EDCA) based media access control (MAC) scheme generally does not work efficiently in an environment with high AP and station density.

A newly formed IEEE 802.11 Study Group named "High Efficiency WLAN (HEW)," also referred to as 802.11ax, has been formed to study, among other things, improving system performance in a high density environment.

SUMMARY

Example embodiments of the present disclosure which provide a system and method for orthogonal frequency division multiple access (OFDMA) PS-poll transmission.

In accordance with an example embodiment of the present disclosure, a method for communicating in a wireless system is provided. The method includes receiving, by a station, a trigger frame including a paging bitmap, and resource allocation information indicating a location of a resource pool for transmitting a packet, and determining, by the station, if the station is permitted to transmit the packet in accordance with the paging bitmap. If the station is permitted to transmit the packet, the method also includes determining, by the station, a location of a network resource in the resource pool in accordance with an identifier of the station, and transmitting, by the station, the packet at the location of the network resource.

In accordance with an example embodiment of the present disclosure, a method for communicating in a wireless system is provided. The method includes transmitting, by an access point, a trigger frame including a paging bitmap, and resource allocation information indicating a location of a resource pool for transmitting a packet, and determining, by the access point, a plurality of potentially transmitting stations in accordance with the paging bitmap. The method also includes determining, by the access point, a plurality of locations of network resources in the resource pool in accordance with identifiers of the stations in the plurality of potentially transmitting stations, and receiving, by the access point, at least one packet on the plurality of locations of network resources.

In accordance with an example embodiment of the present disclosure, a station is provided. The station includes a receiver, a processor operatively coupled to the receiver, and a transmitter operatively coupled to the processor. The receiver receives a trigger frame including a paging bitmap, and resource allocation information indicating a location of a resource pool for transmitting a packet. The processor determines if the station is permitted to transmit the packet in accordance with the paging bitmap, and determines a location of a network resource in the resource pool in accordance with an identifier of the station when the station is permitted to transmit the packet. The transmitter transmits the packet at the location of the network resource when the station is permitted to transmit the packet.

In accordance with an example embodiment of the present disclosure, an access point is provided. The access point includes a transmitter, a processor operatively coupled to the transmitter, and a receiver operatively coupled to the processor. The transmitter transmits a trigger frame including a paging bitmap, and resource allocation information indicating a location of a resource pool for transmitting a packet. The processor determines a plurality of potentially transmitting stations in accordance with the paging bitmap, and determines a plurality of locations of network resources in the resource pool in accordance with identifiers of the stations in the plurality of potentially transmitting stations. The receiver receives at least one packet on the plurality of locations of network resources.

One advantage of an embodiment is that the knowledge of a network resource in which to transmit a response message helps to alleviate contention for network resources and improve overall communications system efficiency.

A further advantage of an embodiment is that techniques for randomizing the assignment of network resources in which to transmit response messages help to reduce transmission collisions, which also helps to improve overall communications system efficiency.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

The present disclosure will be described with respect to example embodiments in a specific context, namely communications systems that use response messages to indicate readiness for receiving transmissions. The disclosure may be applied to standards compliant communications systems, such as those that are compliant with Third Generation Partnership Project (3GPP), IEEE 802.11, and the like, technical standards, and non-standards compliant communications systems, that use response messages to indicate readiness for receiving transmissions.

Figure 1:
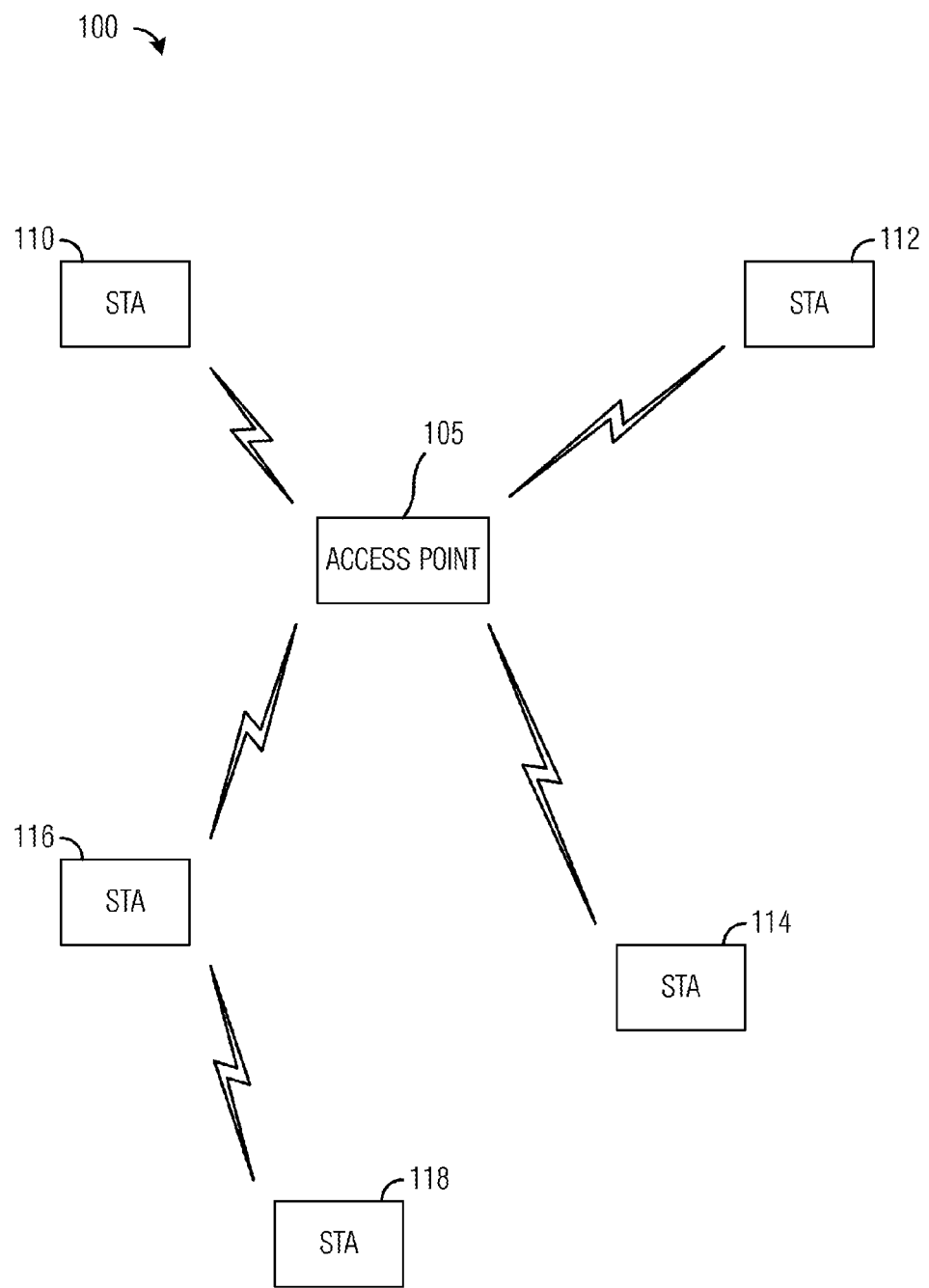
FIG. 1 illustrates an example wireless communications system according to example embodiments described herein.

FIG. 1 illustrates an example wireless communications system 100. Wireless communications system 100 includes an access point (AP) 105 that serves one or more stations, such as stations on (STA) 110-116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
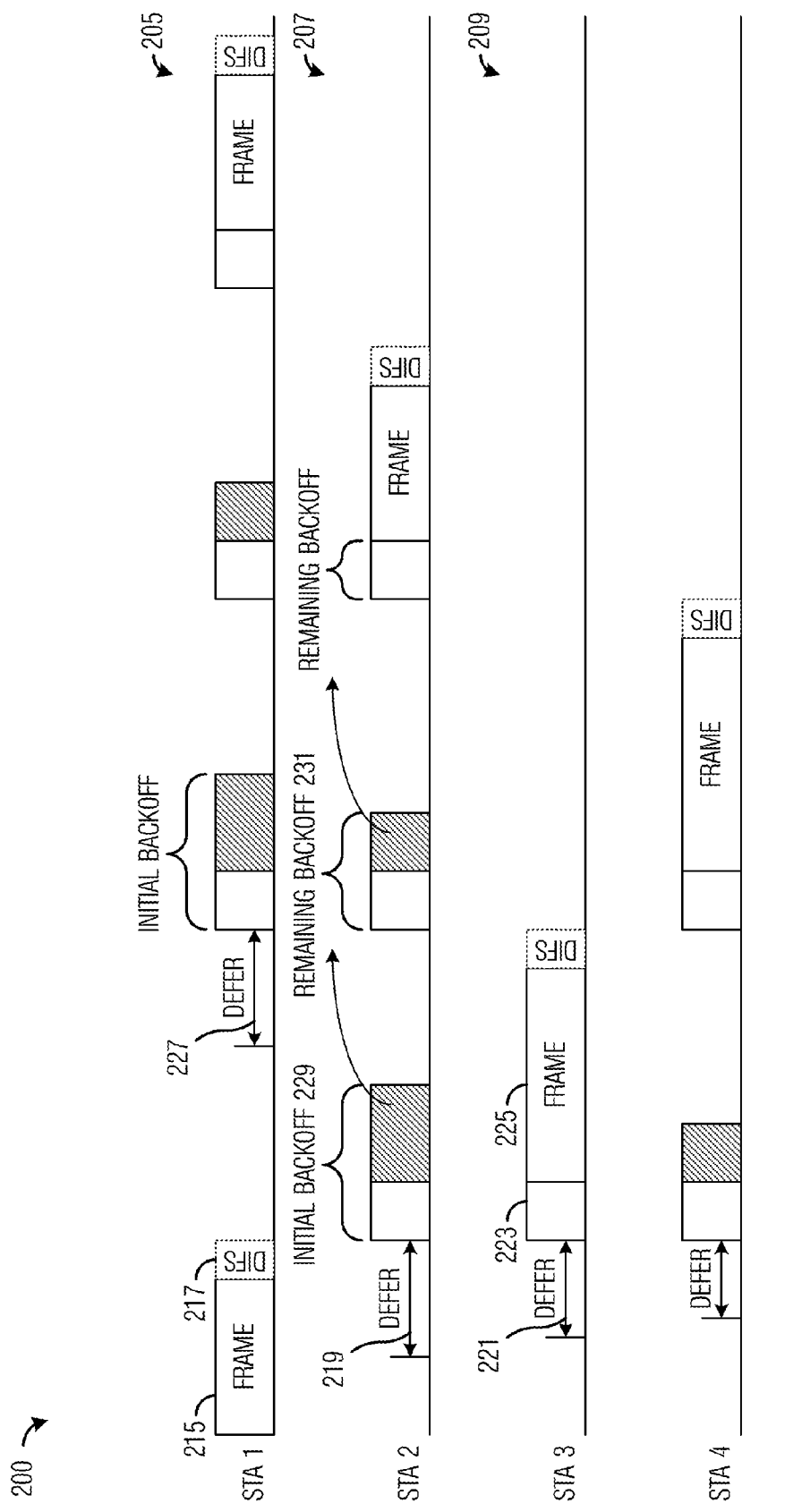
FIG. 2 illustrates a diagram of example channel access timing according to example embodiments described herein.

FIG. 2 illustrates a diagram 200 of example channel access timing. A first trace 205 represents channel access for a first station (STA 1), a second trace 207 represents channel access for a second station (STA 2), and a third trace 209 represents channel access for a third station (STA 3). A short inter-frame space (SIFS) has a duration of 16 microseconds, a point coordination function (PCF) inter-frame space (PIFS) has a duration of 25 microseconds, while a DIFS may last longer than either the SIFS or the PIFS. A backoff period may be a random duration. Therefore, active scanning may not provide the best solution when there are large numbers of stations attempting to perform AP/network discovery.

In cellular communications systems, e.g., 3GPP LTE compliant communications systems, OFDMA has been shown to be able to provide robust performance in high density environments. OFDMA has the ability to support multiple users simultaneously by carrying traffic from different users on different portions of the communications system bandwidth. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

In IEEE 802.11, an AP periodically transmits a Beacon frame. The Beacon frame typically includes the access parameters of the BSS and a traffic indication map (TIM) information element (IE) that includes an indication of which station(s), out of a plurality of stations being served by the AP, the AP has buffered data. The TIM IE may also be referred as the TIM message or simply the TIM. The process of indicating that the AP has buffered data for a station that is in a power-saving mode and wakes up intermittently at pre-subscribed time incidents in order to monitor such an indication is also known as the paging process. As an example, the TIM may include a bitmap with each station of the plurality of stations represented as a bit and the value of a particular bit indicating whether the AP has buffered data for the station represented by the particular bit. Each bit of the bitmaps may be referred to as a transmission indicator. If a station, after receiving the TIM, determines that the AP has buffered data for it, the station may transmit a power-saving poll (PS-poll) to the AP to indicate to the AP that the station is awake and is ready to receive at least some of the buffered data. After receiving the PS-poll(s), the AP directly sends a downlink (DL) data frame to the station(s) or an acknowledgement frame(s) (or simply acknowledgement(s)) if it is not ready to transmit the downlink data. After sending the acknowledgement(s), the AP will send the downlink data soon. Although the discussion presented herein focuses on the terms TIM, TIM map, and TIM bitmap, the example embodiments presented herein are operable with other forms of paging information. In general, such other forms of paging information may be referred to as paging information, paging map, paging bitmap, and the like. A paging bitmap may include a plurality of bits corresponding to stations being potentially paged, with the value of the bits indicating if the station associated with the bits are being paged or not. A TIM bitmap may be an example of a paging bitmap.

Figure 3:
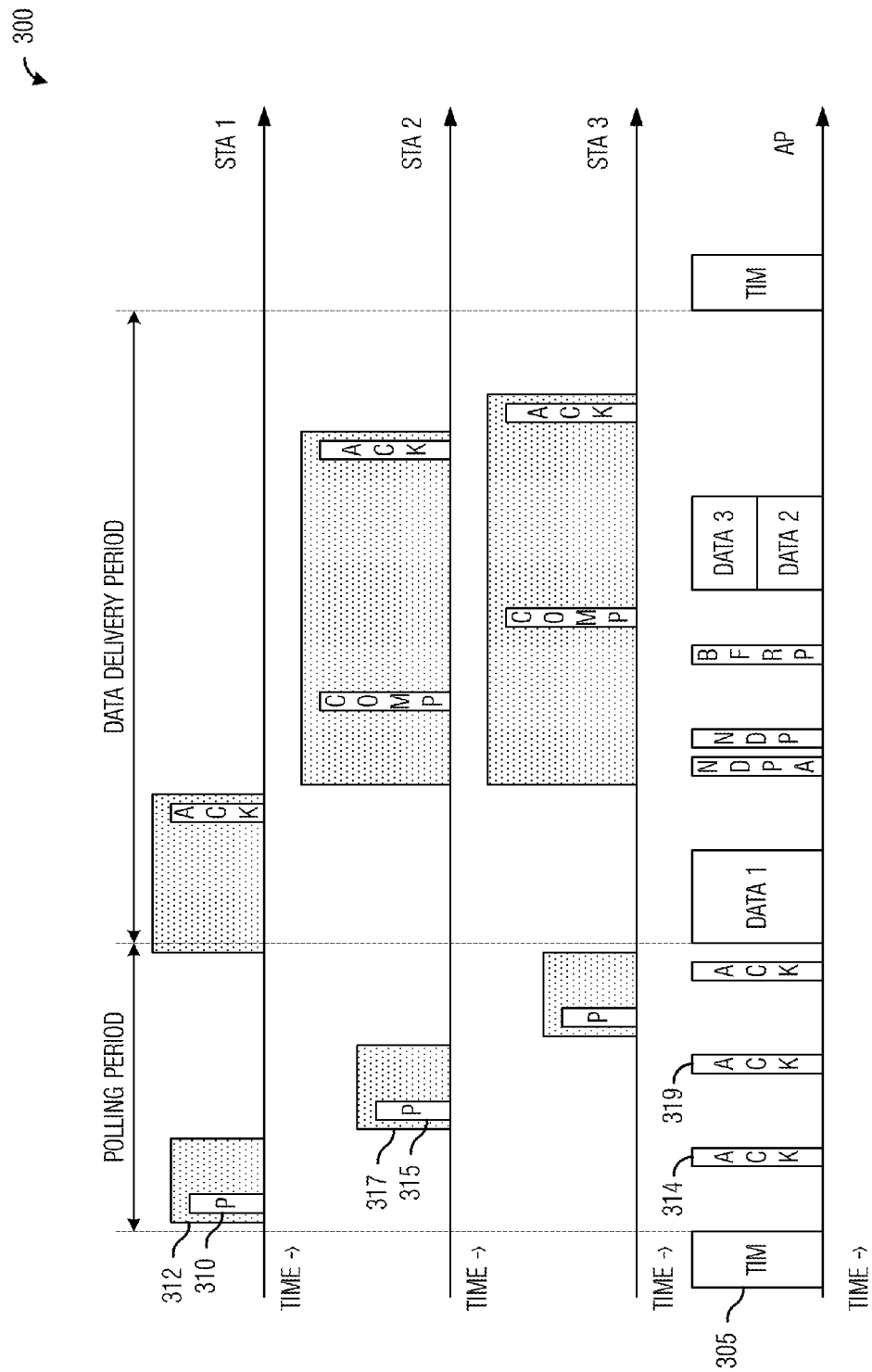
FIG. 3 illustrates a transmission diagram of example transmissions between an AP and a plurality of stations as the AP transmits downlink data to a subset of the plurality of stations according to example embodiments described herein.

FIG. 3 illustrates a transmission diagram 300 of example transmissions between an AP and a plurality of stations as the AP transmits downlink data to a subset of the plurality of stations. Transmission diagram 300 illustrates transmissions between the AP and the plurality of stations as discussed previously. At a first time, the AP transmits a Beacon frame that contains a TIM 305 including an indication of which stations the AP has buffered data. As stations receive and decode TIM 305, those that are indicated as stations that the AP has buffered data for may transmit PS-polls, such as PS-poll 310 and PS-poll 315, during a polling period. Also shown in FIG. 3, are listening regions (shown as dotted regions, such as listening region 312 and listening region 317) when a corresponding station is listening for a transmission(s) intended for it.

When the AP receives the PS-polls, the AP may acknowledge receipt of the PS-polls by transmitting an acknowledgement for each PS-poll received. As an example, the AP may transmit acknowledgement 314 for PS-poll 310 and acknowledgement 319 for PS-poll 315. Each acknowledgement that the AP transmits may further include timing information (e.g., a beginning time and/or a length) of the downlink data that the AP will transmit to the station, based upon which the station may decide to enter a power-saving mode of operation after receiving the acknowledgement until a time at the beginning of the downlink data intended for the station. However, in this way, the AP may have to decide on the data timing for a particular station without knowing all the stations that will transmit their respective PS-polls since some of the stations may not have transmitted their PS-polls by the time the AP has to decide on the data timing. As a result, the decision on the data timing is not generally based on the full intelligence of all the stations that will transmit the PS-polls, thus may not be the most efficient or fair decision. Once the polling period is over, the AP may begin transmitting downlink data to the stations that transmitted PS-polls. The stations may also acknowledge receipt of the downlink data.

In current WLANs, a TIM based technique is used to provide power savings for stations. In the TIM based technique, a station wakes up at one or multiple beacon intervals to listen to a TIM transmitted in a beacon from an AP. The TIM includes a bitmap where each bit represents the presence or absence of a buffered packet(s) for a station corresponding to the bit. As an example, if a bit associated with a station is equal to a 1, then there is a buffered packet(s) for the station at the AP, while if the bit is equal to a 0, then there is not buffered packet(s) for the station at the AP. If there is a buffered packet(s) for the station, the station should stay awake and transmit a power save poll (PS-Poll) frame to the AP to indicate to the AP that the station is ready to receive the buffered packet(s). The PS-Poll frames transmitted by multiple stations need to follow the EDCA rules and has to be sent in a time division multiple access (TDMA) fashion. Upon receiving the PS-Poll(s), the AP can either send the buffered packet(s) to the station(s) or send an acknowledgement(s) to the station(s) and send the buffered packet(s) at a later time. According to an example embodiment, since PS-Poll frames are short, it is beneficial to transmit PS-Poll frames from multiple stations using OFDMA.

In order to transmit OFDMA frames using OFDMA, it may be necessary to determine the allocation of network resources (e.g., a frequency allocation) for multiple stations transmitting on the uplink (UL). In a 3GPP LTE communications system, resource allocations for UL transmissions are scheduled by an evolved NodeB (eNB) and information related to the resource allocations is transmitted from the eNB to user equipments (UEs) through a downlink (DL) control channel. This procedure requires that the eNB know the intention of the UEs to send data, as well as the size of the data, prior to scheduling the resource allocations. But, for PS-Poll transmissions, the AP generally has no knowledge related to which station is going to transmit a PS-Poll frame, therefore, it usually cannot perform resource allocations for PS-Poll frames transmitted on the UL for each station having a corresponding bit in the TIM that is equal to 1.

According to an example embodiment, a station wakes up and listens to a beacon transmitted by an AP. The beacon includes a TIM bitmap, as well as information indicating the location of a resource pool of network resources to be used for PS-Poll transmissions. As an alternative, the beacon includes an indication of one (or more) specified resource pools to be used for PS-Poll transmissions. Although the discussion presented herein focuses on beacons and beacon frames, the example embodiments presented are operable with other types of frames that may be used to trigger the transmission of the PS-Polls. In general, such frames may be referred to as trigger frames.

According to an example embodiment, if the station determines that its corresponding bit in the TIM bitmap is 1, the station derives the location of its network resource to be used for PS-Poll transmission using its identifier, e.g., its MAC address, association identifier (AID), and the like. The station may transmit its PS-Poll using the derived location of the network resource. Since both the station and the AP have common knowledge about the identifier of the station (e.g., MAC address, AID, and the like), both know where to transmit and/or receive the PS-Poll. Since there is no need for the station to transmit its identifier in the PS-Poll, communications overhead may be reduced.

Figure 4A:
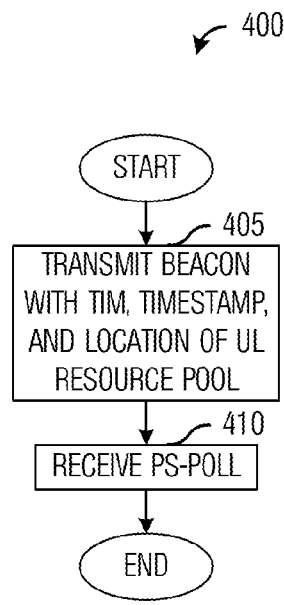
FIGS. 4a and 4b illustrate flow diagrams of example operations occurring in an AP and a station as they participate in PS-Poll transmission using OFDMA and identifier information according to example embodiments described herein.

FIG. 4a illustrates a flow diagram of example operations 400 occurring in an AP participating in PS-Poll transmission using OFDMA and identifier information. Operations 400 may be indicative of operations occurring in an AP, such as AP 105, as the AP participates in PS-Poll transmission using OFDMA and identifier information.

Operations 400 may begin with the AP transmitting a beacon (block 405). The beacon may include a TIM bitmap, as well as a timestamp and a location of a UL resource pool that may be used by a station(s) to transmit PS-Poll(s). The AP may receive PS-Polls in the UL resource pool in accordance with the TIM bitmap (block 410). The AP may receive 0 or more PS-Polls based on the TIM bitmap and the stations that received the TIM bitmap. The PS-Polls that are received by the AP are located in network resource locations derived from the identifier of the stations. As an illustrative example, the derivation of the location of the network resource may be expressed as:

$$i_{station} = A_{station} \text{ modulo } N,$$

where $i_{station}$ is the index of the network resource (e.g., channel) within the resource pool for the station to transmit its PS-Poll frame, $A_{station}$ is the identifier of the station (e.g., MAC address, AID, and the like), and N is the number of network resources (e.g., channels) in the resource pool.

Figure 4B:
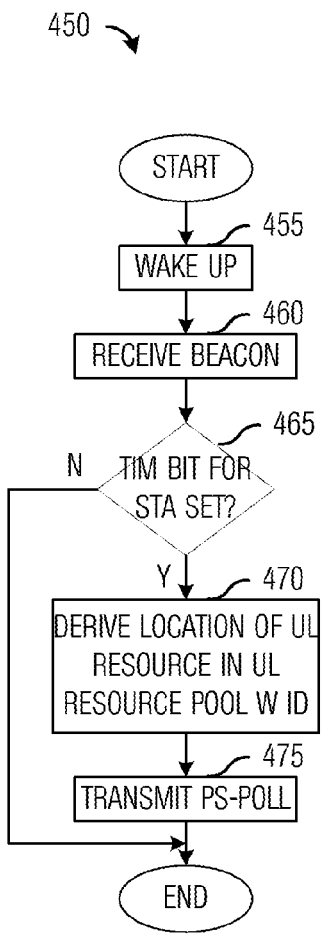

FIG. 4b illustrates a flow diagram of example operations 450 occurring in a station participating in PS-Poll transmission using OFDMA and identifier information. Operations 450 may be indicative of operations occurring in a station, such as stations 110-118, as the station participates in PS-Poll transmission using OFDMA and identifier information.

Operations 450 may begin with the station waking up (block 455). As an illustrative example, the station may wake up from a sleep state or a reduced power state. The station may receive a beacon transmitted by an AP (block 460). The beacon may include a TIM bitmap, as well as a timestamp and a location of a UL resource pool that may be used by a station(s) to transmit PS-Poll(s). The station may perform a check to determine if the AP has data packet(s) buffered for it (block 465). As discussed previously, the station may check the state of a bit in the TIM bitmap associated with the station to determine if the AP has buffered data packet(s) intended for the station. If the AP does have buffered data packet(s) for the station, the station may derive a location of a UL resource in the UL resource pool in accordance with its identifier (block 470). As an illustrative example, the derivation of the location of the network resource may be expressed as:

$$i_{station} = A_{station} \text{ modulo } N.$$

The station may transmit a PS-Poll in the UL resource as located (block 475).

According to an example embodiment, the number of network resources N may be fixed.

According to another example embodiment, the number of network resources N may be dynamically adjusted. As an illustrative example, the number of network resources N may be adjusted dynamically based on a number of stations being paged using the TIM. As an example, consider a situation wherein the TIM bitmap is 16 bits long, indicating that there are 16 stations participating in the TIM-based paging. Out of those 16 stations, the AP has buffered data packets for 7 of the stations. The number of network resources N may be dynamically adjusted to 7 to ensure that there are enough network resources for each of the stations. Similarly, if the AP has buffered data packets for 12 of the stations, the number of network resources N may be dynamically adjusted to 12. Alternatively, the number of network resources N may be dynamically adjusted to be a function of the number of stations with buffered data packets. As an example, N may be a scaling factor times the number of stations with buffered data packets, wherein scaling factor is a number smaller than 1.

In a scenario when the number of network resources is dynamically adjusted, a station receiving the TIM bitmap may be able to determine the number of network resources by examining the TIM bitmap. As an illustrative example, if the TIM bitmap indicates that the AP has buffered data packet(s) for 7 stations, the station may determine that the number of network resources is 7 and use the number in locating a network resource for the transmission of its PS-Poll. As another illustrative example, if the number of network resources is a function of the TIM bitmap and if the TIM bitmap indicates that the AP has buffered data packet(s) for 8 stations, the station may determine that the number of network resources is 8 times a scaling factor and use the number in locating a network resource for the transmission of its PS-Poll.

Figure 5:
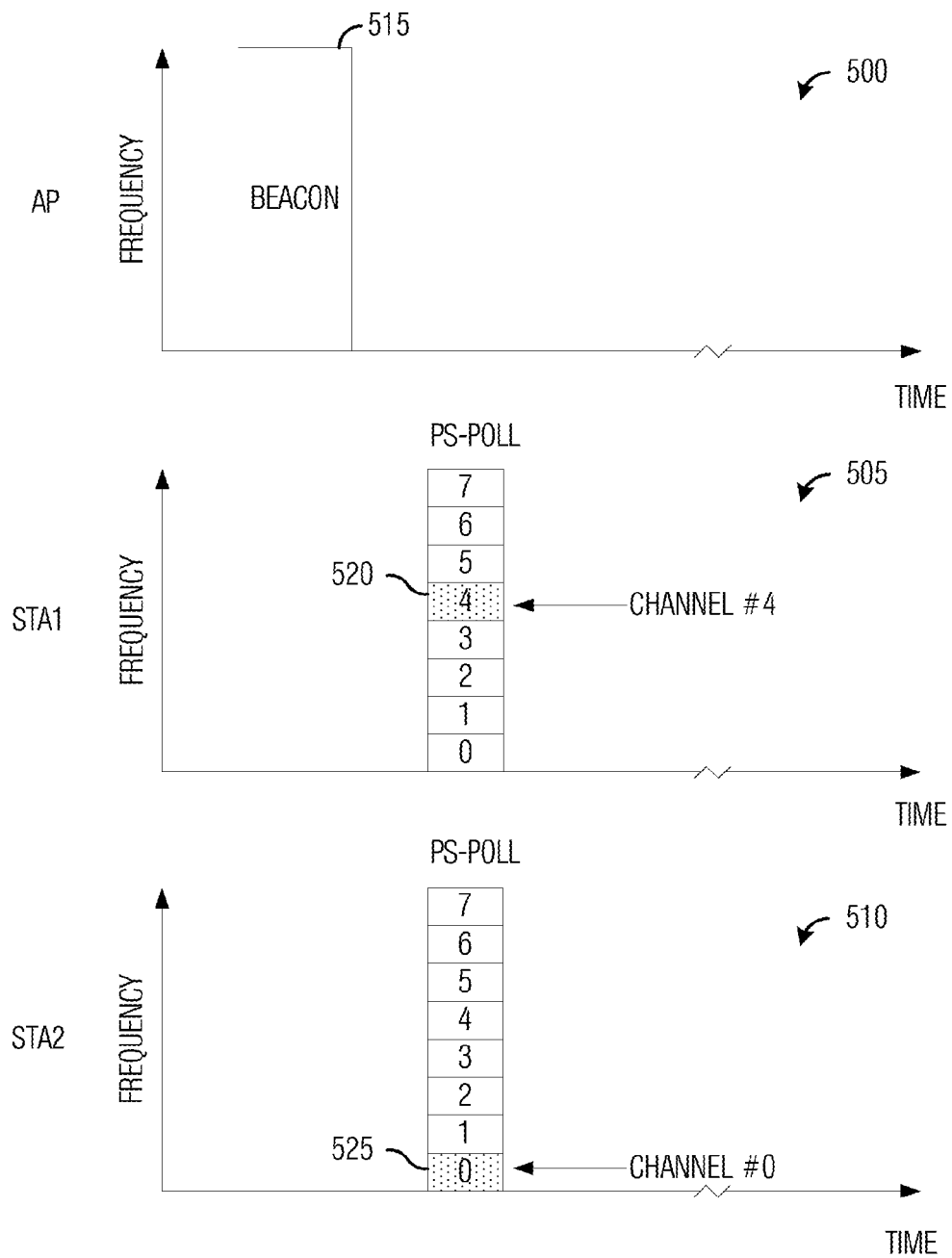
FIG. 5 illustrates an example time-frequency diagrams for an AP and two stations participating in PS-Poll transmission using OFDMA using the stations' identifier to derive the location of network resources according to example embodiments described herein.

FIG. 5 illustrates example time-frequency diagrams for an AP and two stations participating in PS-Poll transmission using OFDMA using the stations' identifier to derive the location of network resources. A first time-frequency diagram 500 displays transmissions made by the AP, a second time-frequency diagram 505 displays transmissions made by a first station (STA1), and a third time-frequency diagram 510 displays transmissions made by a second station (STA2). The AP transmits a beacon 515. For discussion purposes, consider a situation where an identifier (i.e., $A_{station}$) for the first station (STA1) is 20 and the resource pool has a maximum of 8 network resources (i.e., N=8). Then, using the example expression above, $i_{station}$=20 modulo 8=4. Therefore, the first station may transmit its PS-Poll in network resource #4 (shown as block 520). Similarly, if an identifier for the second station (STA2) is 16, then $i_{station}$=16 modulo 8=0. Therefore, the second station may transmit its PS-Poll in network resource #0 (shown as block 525).

According to an example embodiment, a station wakes up and listens to a beacon transmitted by an AP. The beacon includes a TIM bitmap, as well as information indicating the location of a resource pool of network resources to be used for PS-Poll transmissions. As an alternative, the beacon includes an indication of one (or more) specified resource pools to be used for PS-Poll transmissions. The beacon also includes a timestamp or timestamp information. Although the discussion presented herein focuses on beacons and beacon frames, the example embodiments presented are operable with other types of frames that may be used to trigger the transmission of the PS-Polls. In general, such frames may be referred to as trigger frames.

According to an example embodiment, if the station determines that its corresponding bit in the TIM bitmap is 1, the station derives the location of its network resource to be used for PS-Poll transmission using its identifier, e.g., its MAC address, association identifier (AID), and the like, and timing information, e.g., the timestamp, of the beacon. The inclusion of the timing information helps to randomize the location of the PS-Poll transmission over time and can randomize the interference that the station observes or generates over time, helping to improve the robustness of the communications system. The station may transmit its PS-Poll using the derived location of the network resource. Since both the station and the AP have common knowledge about the identifier of the station (e.g., MAC address, AID, and the like) and the timing information, both know where to transmit and/or receive the PS-Poll.

Figure 6A:
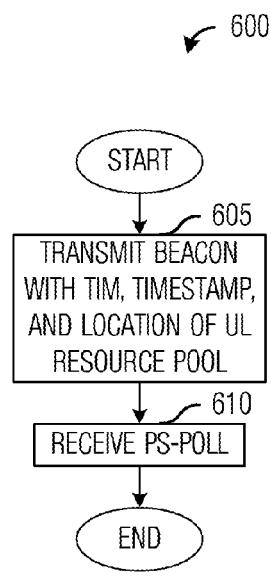
FIGS. 6a and 6b illustrate flow diagrams of example operations occurring in an AP and a station as they participate in PS-Poll transmission using OFDMA and identifier information and timing information according to example embodiments described herein.

FIG. 6a illustrates a flow diagram of example operations 600 occurring in an AP participating in PS-Poll transmission using OFDMA and identifier information and timing information. Operations 600 may be indicative of operations occurring in an AP, such as AP 105, as the AP participates in PS-Poll transmission using OFDMA and identifier information and timing information.

Operations 600 may begin with the AP transmitting a beacon (block 605). The beacon may include a TIM bitmap, as well as a timestamp and a location of a UL resource pool that may be used by a station(s) to transmit PS-Poll(s). The AP may receive PS-Polls in the UL resource pool in accordance with the TIM bitmap (block 610). The AP may receive 0 or more PS-Polls based on the TIM bitmap and the stations that received the TIM bitmap. The PS-Polls that are received by the AP are located in network resource locations derived from the identifier of the stations as well as timing information associated with the beacon. As an illustrative example, the derivation of the location of the network resource may be expressed as:

$$i_{station} = (A_{station} + \text{timing information}) \bmod N,$$

where $i_{station}$ is the index of the network resource (e.g., channel) within the resource pool for the station to transmit its PS-Poll frame, $A_{station}$ is the identifier of the station (e.g., MAC address, AID, and the like), timing information (e.g., timestamp) is the timing information included in the beacon, and N is the number of network resources (e.g., channels) in the resource pool.

Figure 6B:
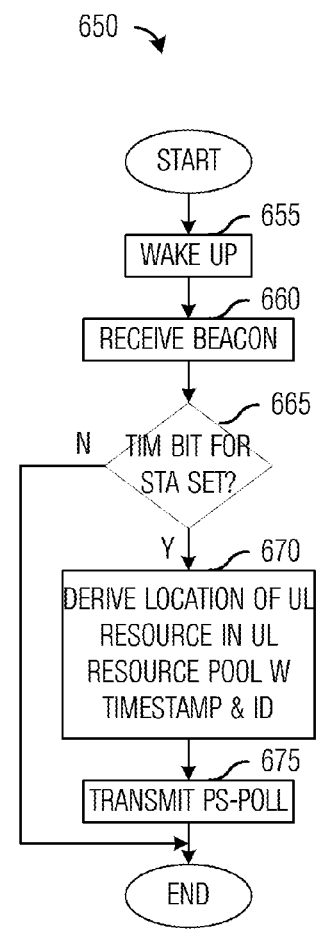

FIG. 6b illustrates a flow diagram of example operations 650 occurring in a station participating in PS-Poll transmission using OFDMA and identifier information and timing information. Operations 650 may be indicative of operations occurring in a station, such as stations 110-118, as the station participates in PS-Poll transmission using OFDMA and identifier information and timing information.

Operations 650 may begin with the station waking up (block 655). As an illustrative example, the station may wake up from a sleep state or a reduced power state. The station may receive a beacon transmitted by an AP (block 660). The beacon may include a TIM bitmap, as well as a timestamp and a location of a UL resource pool that may be used by a station(s) to transmit PS-Poll(s). The station may perform a check to determine if the AP has data packet(s) buffered for it (block 665). As discussed previously, the station may check the state of a bit in the TIM bitmap associated with the station to determine if the AP has buffered data packet(s) intended for the station. If the AP does have buffered data packet(s) for the station, the station may derive a location of a UL resource in the UL resource pool in accordance with its identifier and the timing information provided in the beacon (block 670). As an illustrative example, the derivation of the location of the network resource may be expressed as:

$$i_{station} = (A_{station} + \text{timing information}) \bmod N.$$

The station may transmit a PS-Poll in the UL resource as located (block 675).

Figure 7:
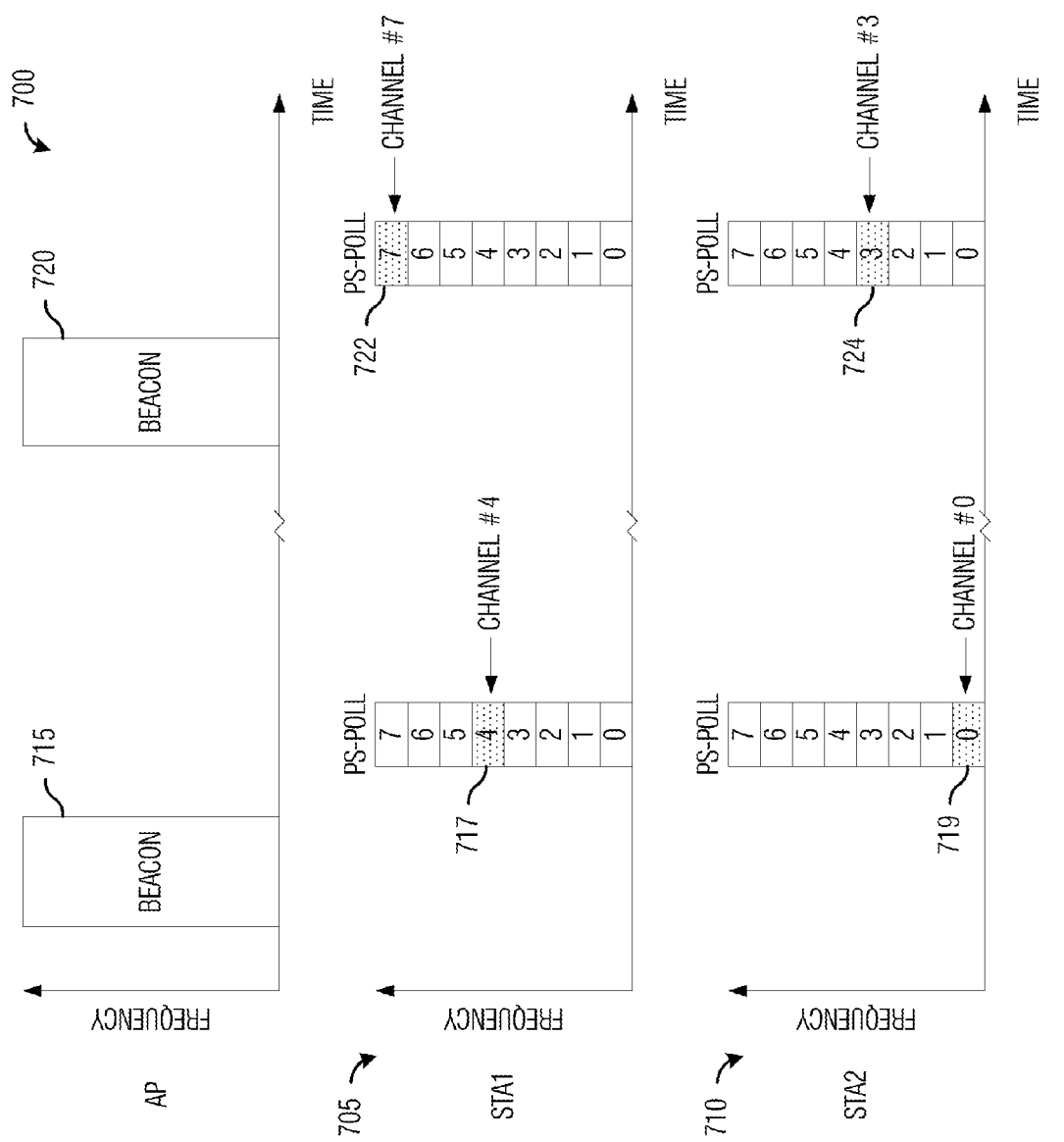
FIG. 7 illustrates an example time-frequency diagrams for an AP and two stations participating in PS-Poll transmission using OFDMA using the stations' identifier and timing information to derive the location of network resources according to example embodiments described herein.

FIG. 7 illustrates example time-frequency diagrams for an AP and two stations participating in PS-Poll transmission using OFDMA using the stations' identifier and timing information to derive the location of network resources. A first time-frequency diagram 700 displays transmissions made by the AP, a second time-frequency diagram 705 displays transmissions made by a first station (STA1), and a third time-frequency diagram 710 displays transmissions made by a second station (STA2). The AP transmits a first beacon 715. For discussion purposes, consider a situation where an identifier (i.e., $A_{station}$) for the first station (STA1) is 20, the timing information associated with first beacon 715 is 64, and the resource pool has a maximum of 8 network resources (i.e., N=8). Then, using the example expression above, $i_{station} = (20+64) \bmod 8 = 4$ (shown as block 717). Therefore, the first station may transmit its PS-Poll in network resource #4. But at a second beacon 720 transmitted by the AP with timing information of 163, $i_{station} = (20+163) \bmod 8 = 7$ and the first station may use network resource #7 (shown as block 722) after receiving second beacon 720. Similarly, if an identifier for the second station (STA2) is 32, then $i_{station} = (32+64) \bmod 8 = 0$. Therefore, the second station may transmit its PS-Poll in network resource #0 (shown as block 719) after receiving first beacon 715. But after receiving second beacon 720 with timing information of 163, $i_{station} (32+163) \bmod 8 = 3$ and the second station may use network resource #3 (shown as block 724) after receiving second beacon 720.

Since in the example embodiments presented above, the stations derive the location of their network resources for PS-Poll transmission according to at least one of an identifier, and an identifier and timing information, it is possible for two (or more) stations to derive the same location for their respective network resources, resulting in a collision of PS-Poll transmissions. When a collision occurs, it may still be possible for one of the colliding PS-Polls to be received correctly if its signal to interference plus noise ratio (SINR) is higher at the AP. According to an example embodiment, the AP may be able to distinguish the transmitter of the PS-Poll from the many possible transmitters using abbreviated station identifying information that is included with the PS-Poll transmission. The abbreviated station identifying information may, in general, be shorter than the station's identifying information, such as its AID, MAC address, and the like, to help reduce communications overhead. It is noted that the position of the station's bit in a plurality of potentially transmitting stations in the TIM bitmap may be used as the abbreviated station identifying information. The number of bits required to indicate the index of the position of the station's bit is much smaller than a regular MAC address of 6 bytes. As an illustrative example, assuming a maximum of 8 1's per TIM bitmap, then only 3 bits is required to indicate the position of the station's bit and identify the transmitter of the PS-Poll. Then, for a station having the first bit in the TIM bitmap with a 1 would have an abbreviated station identifying information of 000, a station having the second bit in the TIM bitmap with a 1 would have an abbreviated station identifying information value of 001, a station having the third bit in the TIM bitmap with a 1 would have an abbreviated station identifying information value of 010, a station having the eighth bit in the TIM bitmap with a 1 would have an abbreviated station identifying information of 111, and so on.

Figure 8:
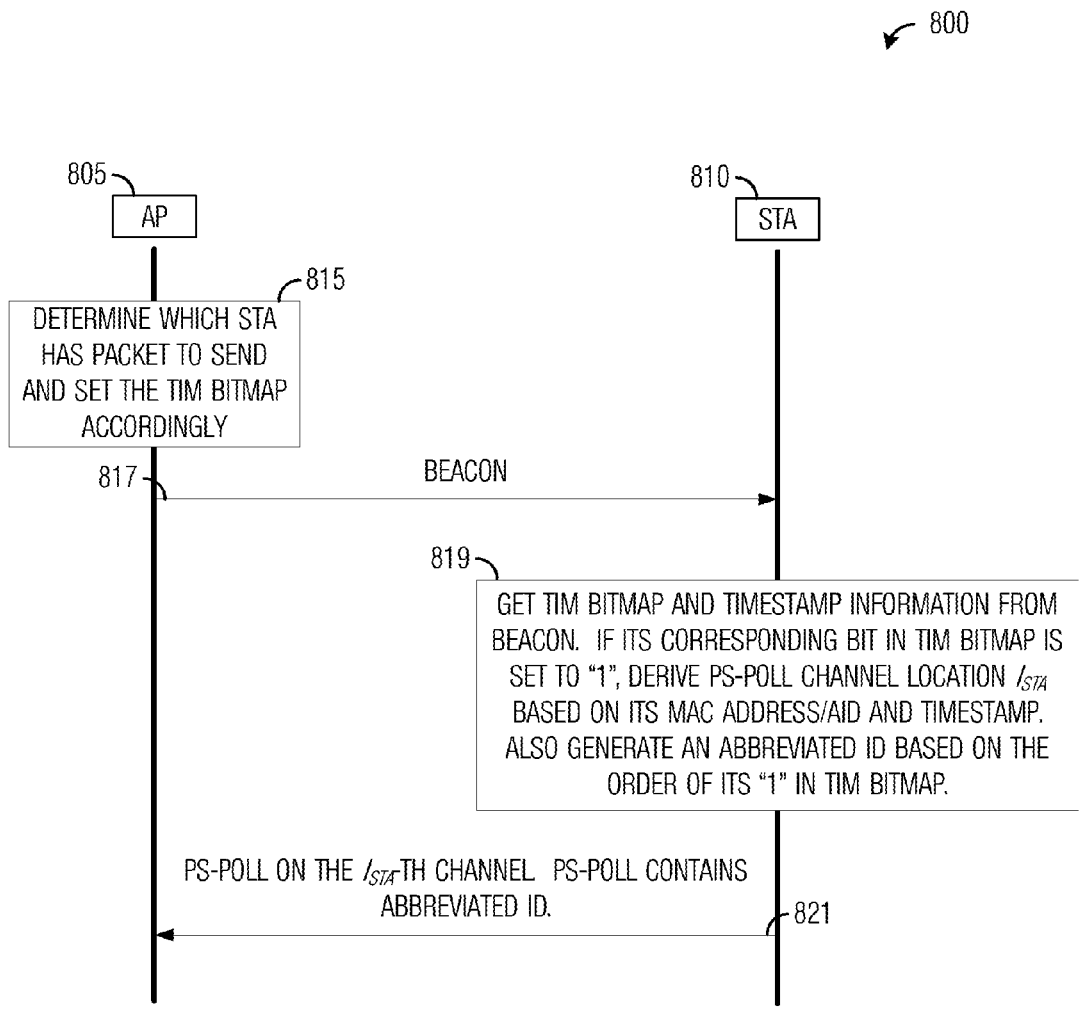
FIG. 8 illustrates an example message exchange diagram between an AP and a station wherein abbreviated station identifying information is included in a PS-Poll transmitted by the station according to example embodiments described herein.

FIG. 8 illustrates an example message exchange diagram 800 between an AP 805 and a station 810 wherein abbreviated station identifying information is included in a PS-Poll transmitted by station 810. The abbreviated station identifying information may be based on the order or position of the station's bit in the plurality of potentially transmitting stations in the TIM bitmap included in the beacon. AP 805 may begin by determining for which stations it has buffered data packet(s) and sets its TIM bitmap accordingly (block 815). AP 805 may transmit a beacon including the TIM bitmap (shown as event 817). The beacon may also include timestamp information. Station 810 may determine if its corresponding bit in the TIM bitmap is set (to 1, for example). If the corresponding bit is set, station 810 may derive a location for its PS-Poll in accordance with an identifier (such as AID, MAC address, and the like) and a timestamp provided by the beacon, as well as generate an abbreviated station identifier based on the order of its position in the TIM bitmap (block 819). Station 810 may transmit the PS-Poll in the derived location (shown as event 821). The PS-Poll may also include the abbreviated station identifier generated based on the position of station 810 in the TIM bitmap.

Figure 9A:
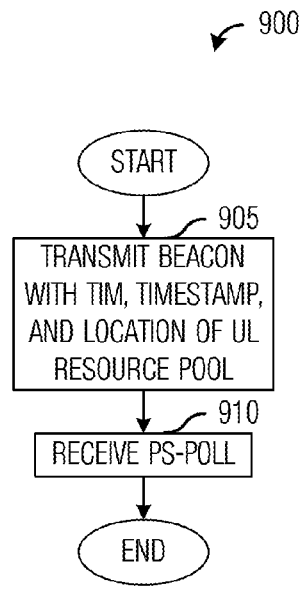
FIGS. 9a and 9b illustrate flow diagrams of example operations occurring in an AP and a station as they participate in PS-Poll transmission using an abbreviated station identifier to help facilitate recovery after collision according to example embodiments described herein.

FIG. 9a illustrates a flow diagram of example operations 900 occurring in an AP participating in PS-Poll transmission using an abbreviated station identifier to help facilitate recovery after collision. Operations 900 may be indicative of operations occurring in an AP, such as AP 105, as the AP participates in PS-Poll transmission using an abbreviated station identifier to help facilitate recovery after collision.

Operations 900 may begin with the AP transmitting a beacon (block 905). The beacon may include a TIM bitmap, as well as a timestamp and a location of a UL resource pool that may be used by a station(s) to transmit PS-Poll(s). The AP may receive PS-Polls in the UL resource pool in accordance with the TIM bitmap (block 910). The AP may receive 0 or more PS-Polls based on the TIM bitmap and the stations that received the TIM bitmap. The PS-Polls may include abbreviated station identifiers, derived from the respective station's position in the TIM bitmap, for example. The PS-Polls that are received by the AP are located in network resource locations derived from the identifier of the stations (e.g., the identifier of the station, such as AID, MAC address, and the like) as well as timing information associated with the beacon.

Figure 9B:
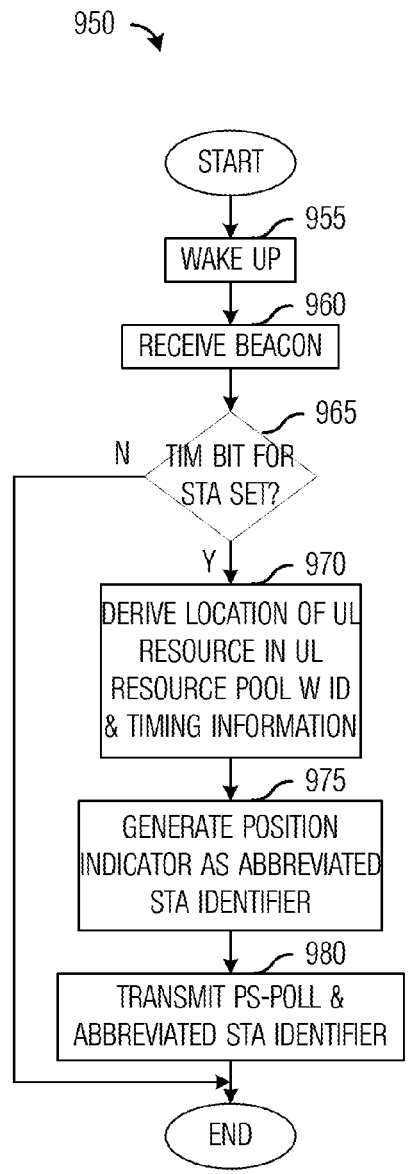

FIG. 9b illustrates a flow diagram of example operations 950 occurring in station participating in PS-Poll transmission using a station identifier to help facilitate recovery after collision. Operations 950 may be indicative of operations occurring in a station, such as stations 110-118, as the station participates in PS-Poll transmission using a station identifier to help facilitate recovery after collision.

Operations 950 may begin with the station waking up (block 955). As an illustrative example, the station may wake up from a sleep state or a reduced power state. The station may receive a beacon transmitted by an AP (block 960). The beacon may include a TIM bitmap, as well as a timestamp and a location of a UL resource pool that may be used by a station(s) to transmit PS-Poll(s). The station may perform a check to determine if the AP has data packet(s) buffered for it (block 965). As discussed previously, the station may check the state of a bit in the TIM bitmap associated with the station to determine if the AP has buffered data packet(s) intended for the station. If the AP does have buffered data packet(s) for the station, the station may derive a location of a UL resource in the UL resource pool in accordance with its identifier and the timing information provided in the beacon (block 970). The station may generate an abbreviated station identifier (block 975). As an illustrative example, the abbreviated station identifier may be generated in accordance with the station's position in the TIM bitmap. The station may transmit a PS-Poll in the UL resource as located, with the PS-Poll including the abbreviated station identifier (block 980).

According to an example embodiment, to solve PS-Poll collisions and enable the randomization of network resources for PS-Poll transmission over time, the station may derive the location of its network resources for PS-Poll transmission in accordance with the position of its bit in the plurality of potentially transmitting stations in the TIM bitmap and timing information, e.g., a timestamp, received from the beacon. The use of timing information in derivation of the location of the network resources randomizes the interference that a station observes and/or generates over time.

If the station determines that its corresponding bit in the TIM bitmap is 1, the station derives the location of its network resource to be used for PS-Poll transmission using the order or position of its bit in the plurality of potentially transmitting stations in the TIM bitmap, and timing information (e.g., the timestamp) included in the beacon. Since both the station and the AP have common knowledge about both the order and/or position of the station's bit in the plurality of potentially transmitting stations in the TIM bitmap and the timing information, both know where to transmit and/or receive the PS-Poll.

Figure 10A:
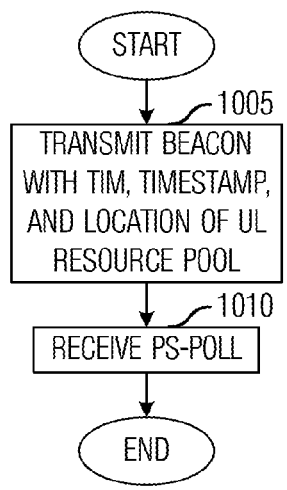
FIGS. 10a and 10b illustrate flow diagrams of example operations occurring in an AP and a station as they participate in PS-Poll transmission using OFDMA with abbreviated station identifying information and timing information according to example embodiments described herein.

FIG. 10a illustrates flow diagrams of example operations 1000 occurring in an AP participating in PS-Poll transmission using OFDMA with abbreviated station identifying information and timing information. Operations 1000 may be indicative of operations occurring in an AP, such as AP 105, as the AP participates in PS-Poll transmission using OFDMA with abbreviated station identifying information and timing information.

Operations 1000 may begin with the AP transmitting a beacon (block 1005). The beacon may include a TIM bitmap, as well as a timestamp and a location of a UL resource pool that may be used by a station(s) to transmit PS-Poll(s). The AP may receive PS-Polls in the UL resource pool in accordance with the TIM bitmap (block 1010). The AP may receive 0 or more PS-Polls based on the TIM bitmap and the stations that received the TIM bitmap. The PS-Polls that are received by the AP are located in network resource locations derived from the abbreviated station identifier associated with the stations as well as timing information associated with the beacon. As an illustrative example, the derivation of the location of the network resource may be expressed as:

$$i_{station}=(\text{OneOrder}_{station}+\text{timing information}) \mod N,$$

where $i_{station}$ is the index of the network resource (e.g., channel) within the resource pool for the station to transmit its PS-Poll frame, $\text{OneOrder}_{station}$ is the order or position of the bit associated with the station in the plurality of potentially transmitting stations in the TIM bitmap (i.e., the abbreviated station identifying information or abbreviated station identifier), timing information (e.g., timestamp) is the timing information included in the beacon, and N is the number of network resources (e.g., channels) in the resource pool.

Figure 10B:
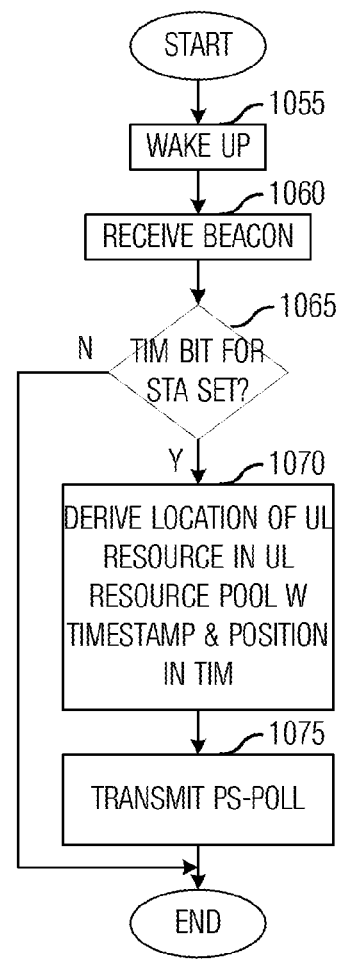

FIG. 10b illustrates flow diagrams of example operations 1050 occurring in a station participating in PS-Poll transmission using OFDMA with abbreviated station identifying information and timing information. Operations 1050 may be indicative of operations occurring in a station, such as stations 110-118, as the station participates in PS-Poll transmission using OFDMA with abbreviated station identifying information and timing information.

Operations 1050 may begin with the station waking up (block 1055). As an illustrative example, the station may wake up from a sleep state or a reduced power state. The station may receive a beacon transmitted by an AP (block 1060). The beacon may include a TIM bitmap, as well as a timestamp and a location of a UL resource pool that may be used by a station(s) to transmit PS-Poll(s). The station may perform a check to determine if the AP has data packet(s) buffered for it (block 1065). As discussed previously, the station may check the state of a bit in the TIM bitmap associated with the station to determine if the AP has buffered data packet(s) intended for the station. If the AP does have buffered data packet(s) for the station, the station may derive a location of a UL resource in the UL resource pool in accordance with its abbreviated station identifier, and the timing information provided in the beacon (block 1070). As an illustrative example, the derivation of the location of the network resource may be expressed as:

$$i_{station}=(OneOrder_{station}+\text{timing information}) \text{ modulo } N.$$

The station may transmit a PS-Poll in the UL resource as located (block 1075).

Figure 11:
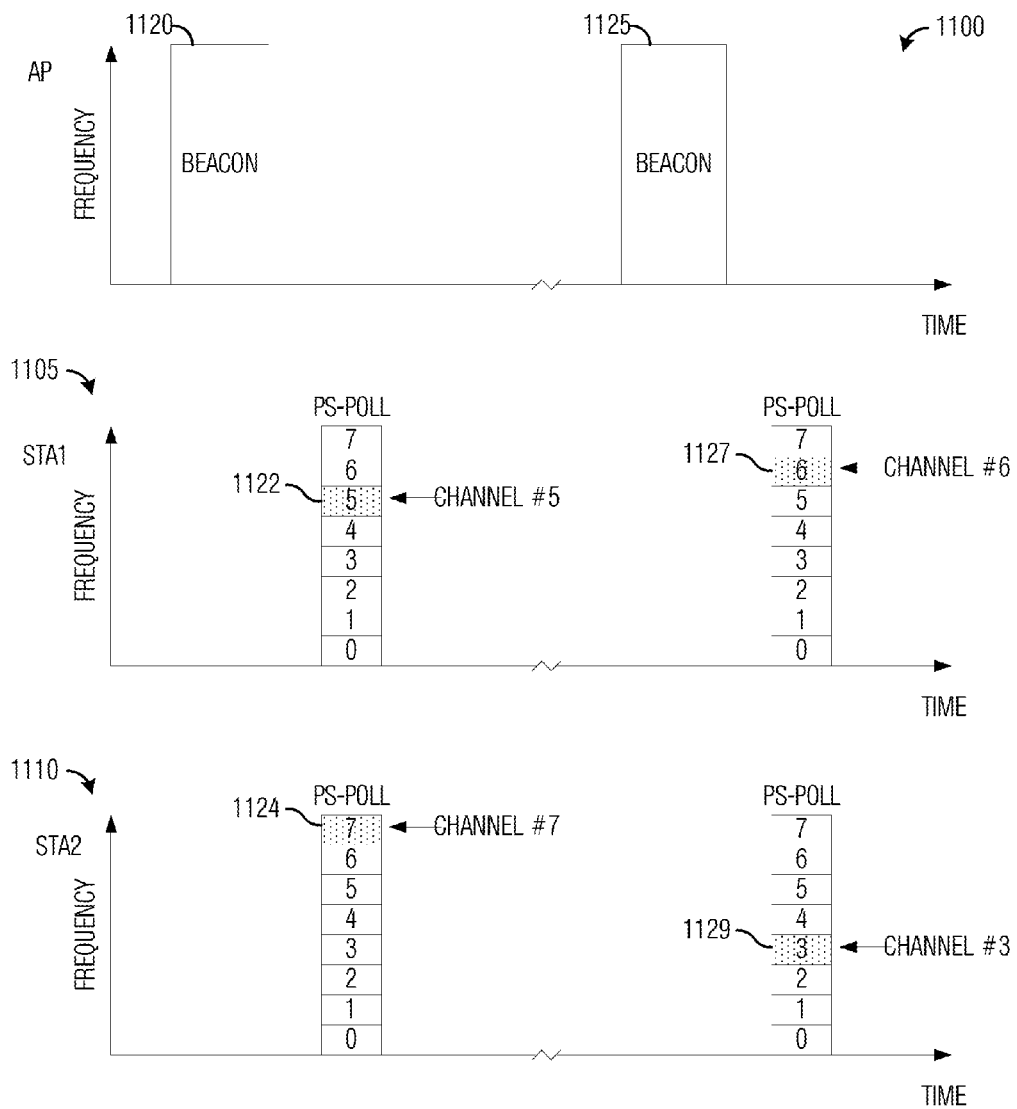
FIG. 11 illustrates example time-frequency diagrams for an AP and two stations participating in PS-Poll transmission using OFDMA using the abbreviated station identifying information and timing information to derive the location of network resources according to example embodiments described herein.

FIG. 11 illustrates time-frequency diagrams for an AP and two stations participating in PS-Poll transmission using OFDMA using the abbreviated station identifying information and timing information to derive the location of network resources. A first time-frequency diagram 1100 displays transmissions made by the AP, a second time-frequency diagram 1105 displays transmissions made by a first station (STA1), and a third time-frequency diagram 1110 displays transmissions made by a second station (STA2). The AP transmits a first beacon 1120 and a second beacon 1125. For discussion purposes, consider a situation where abbreviated station identifying information (i.e., $OneOrder_{station}$) for the first station (STA1) is 5, the timing information is 64, and the resource pool has a maximum of 8 network resources (i.e., N=8). Then, using the example expression above, $i_{station}$=(5+64) modulo 8=5. Therefore, the first station may transmit its PS-Poll in network resource #5 (shown as block 1122). But at second beacon 1125 with timing information of 163 and abbreviated station identifying information is 3, $i_{station}$=(3+163) modulo 8=6 and the first station may use network resource #6 (shown as block 1127) after receiving second beacon 1125. Similarly, if abbreviated station identifying information for the second station (STA2) is 7, then $i_{station}$=(7+64) modulo 8=7. Therefore, the second station may transmit its PS-Poll in network resource #7 (shown as block 1124). But after second beacon 1125 with timing information of 163 and abbreviated station identifying information is 8, $i_{station}$=(8+163) modulo 8=3 and the second station may use network resource #3 (shown as block 1129) after receiving second beacon 1125.

According to an example embodiment, the use of OFDMA for PS-Poll transmissions makes more efficient usage of resources than EDCA. Additionally, randomization of the location (e.g., network resources or channels) of the PS-Poll transmissions over time also randomizes interference observed and/or generated by a station, which helps to improve the robustness of the communications system. Furthermore, communications overhead is reduced since the need for the station to transmit its identifier, e.g., MAC address, AID, and the like, is eliminated, and abbreviated station identifying information based on the order or position of the station's bit in the plurality of potentially transmitting stations in the TIM bitmap is sufficient to identify a station.

Figure 12:
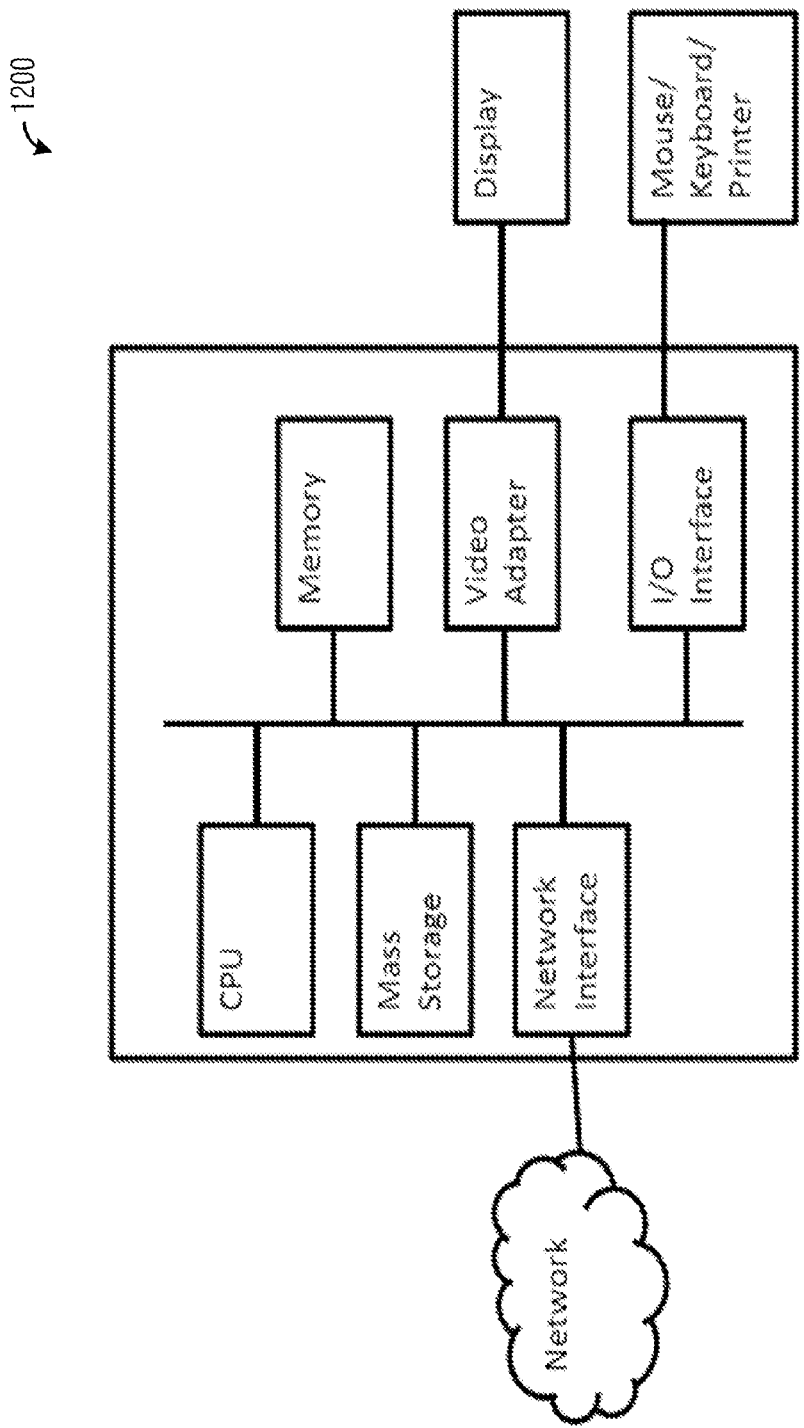
FIG. 12 illustrates an example computing platform that may be used for implementing, for example, the devices and methods described herein, according to example embodiments described herein.

FIG. 12 is a block diagram of a processing system 1200 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and addi- tional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 13:
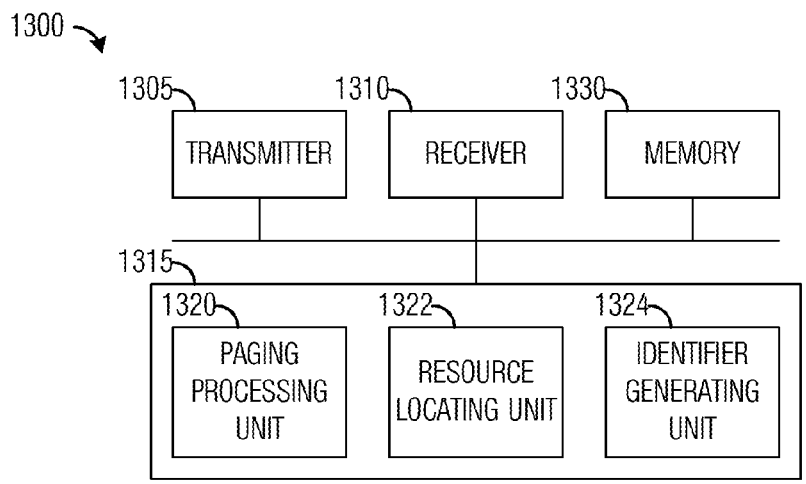
FIG. 13 illustrates an example first communications device according to example embodiments described herein.

FIG. 13 illustrates an example first communications device 1300. Communications device 1300 may be an implementation of a station. Communications device 1300 may be used to implement various ones of the embodiments discussed herein. As shown in FIG. 13, a transmitter 1305 is configured to transmit packets, PS-Polls, and the like. Communications device 1300 also includes a receiver 1310 that is configured to receive packets, trigger frames (such as beacons, and the like), and the like.

A paging processing unit 1320 is configured to process paging information. Paging processing unit 1320 is configured to process TIM bitmaps to determine if an AP has data packet(s) buffered for communications device 1300. Paging processing unit 1320 is configured to determine a location of communications device 1300 in the paging information. A resource locating unit 1322 is configured to locate a network resource, such as an UL resource, in a resource pool. Resource locating unit 1322 is configured to use information, such as, an identifier associated with communications device 1300, an abbreviated station identifier, timing information, and the like, to locate the network resource. Resource locating unit 1322 is configured to use the TIM bitmap to determine a size for the network resource pool. An identifier generating unit 1324 is configured to generate abbreviate station identifier. Identifier generating unit 1324 is configured to generate the abbreviate station identifier from the position of communications device 1300 in a TIM bitmap, for example. A memory 1330 is configured to store packets, trigger frames, paging information, TIM information, identifiers, abbreviated station identifiers, network resource locations, network resource pool size and location, and the like.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, receiver 1310 and transmitter 1305 may be implemented as a specific hardware block, while paging processing unit 1320, resource locating unit 1322, and identifier generating unit 1324 may be software modules executing in a microprocessor (such as processor 1315) or a custom circuit or a custom compiled logic array of a field programmable logic array. Paging processing unit 1320, resource locating unit 1322, and identifier generating unit 1324 may be modules stored in memory 1330.

Figure 14:
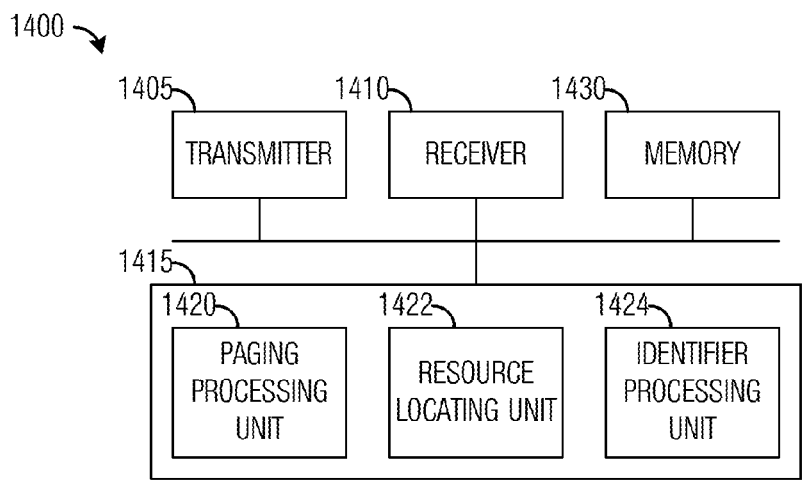
FIG. 14 illustrates an example second communications device according to example embodiments described herein.

FIG. 14 illustrates an example second communications device 1400. Communications device 1400 may be an implementation of an AP. Communications device 1400 may be used to implement various ones of the embodiments discussed herein. As shown in FIG. 14, a transmitter 1405 is configured to transmit packets, trigger frames (such as beacons), and the like. Communications device 1400 also includes a receiver 1410 that is configured to receive packets, PS-Polls, and the like.

A paging processing unit 1420 is configured to generate paging information. Paging processing unit 1420 is configured to process TIM bitmaps based on which stations served by communications device 1400 have buffered data packet(s) intended for them and which ones have been selected for service. A resource locating unit 1422 is configured to locate network resources of a network resource pool usable by the stations to transmit PS-Polls to communications device 1400. Resource locating unit 1422 is configured to size the network resource pool based on the TIM bitmaps. An identifier processing unit 1424 is configured to process received abbreviated station identifiers to determine sources of PS-Polls. Identifier processing unit 1424 is configured to generate abbreviate station identifiers based on the TIM bitmap to assist in identifying sources of PS-Polls. A memory 1430 is configured to store packets, trigger frames, paging information, TIM information, identifiers, abbreviated station identifiers, network resource locations, network resource pool size and location, and the like.

The elements of communications device 1400 may be implemented as specific hardware logic blocks. In an alternative, the elements of communications device 1400 may be implemented as software executing in a processor, controller, application specific integrated circuit, or so on. In yet another alternative, the elements of communications device 1400 may be implemented as a combination of software and/or hardware.

As an example, receiver 1410 and transmitter 1405 may be implemented as a specific hardware block, while paging processing unit 1420, resource locating unit 1422, and identifier processing unit 1424 may be software modules executing in a microprocessor (such as processor 1415) or a custom circuit or a custom compiled logic array of a field programmable logic array. Paging processing unit 1420, resource locating unit 1422, and identifier processing unit 1424 may be modules stored in memory 1430.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating in a wireless system, the method comprising:
    receiving, by a station, a trigger frame including a paging bitmap and resource allocation information, the paging bitmap indicating whether the station is permitted to transmit a packet, the resource allocation information indicating a pool of frequency channels;
    determining, by the station, that the station is permitted to transmit the packet in accordance with the paging bitmap and, based thereon:
        deriving, by the station, an abbreviated identifier of the station from a location of a bit corresponding to the station in the paging bitmap, wherein the abbreviated identifier of the station is shorter than an identifier of the station;
        determining, by the station, a frequency channel in the pool of frequency channels in accordance with the abbreviated identifier of the station; and
        transmitting, by the station, the packet at the determined frequency channel;
    wherein determining the frequency channel comprises:
        calculating a location, wherein the $$\text{location} = \text{OneOrder}_{station} \text{ modulo } N,$$

wherein $\text{OneOrder}_{station}$ is the abbreviated identifier of the station, and N is a number of frequency channels in the pool; and
        selecting a frequency channel indicated by the location as the determined frequency channel.

2. The method of claim 1, wherein the trigger frame comprises a beacon frame.

3. The method of claim 1, wherein the paging bitmap comprises a traffic indication map (TIM) bitmap.

4. The method of claim 1, wherein the trigger frame further includes timing information, and wherein determining the frequency channel in the pool of frequency channels is in accordance with the timing information.

5. The method of claim 1, wherein a plurality of potentially transmitting stations are indicated in the paging bitmap.

6. The method of claim 1, wherein the trigger frame further includes timing information,
    wherein the $$\text{location} = (\text{OneOrder}_{station} + \text{time\_info}) \text{ modulo } N,$$

wherein time_info is the timing information.

7. The method of claim 1, further comprising determining a size of the pool of frequency channels in accordance with a number of stations in a plurality of potentially transmitting stations as indicated in the paging bitmap.

8. A station comprising:
    a receiver configured to receive a trigger frame including a paging bitmap and resource allocation information, the paging bitmap indicating whether the station is permitted to transmit a packet, the resource allocation information indicating a pool of frequency channels; and a processor operatively coupled to the receiver, the processor configured to determine that the station is permitted to transmit the packet in accordance with the paging bitmap, and based thereon to determine a frequency channel in the pool of frequency channels in accordance with an abbreviated identifier of the station, wherein the abbreviated identifier of the station is derived from a location of a bit corresponding to the station in the paging bitmap, and wherein the abbreviated identifier of the station is shorter than an identifier of the station; and a transmitter operatively coupled to the processor, the transmitter is configured to transmit the packet at the determined frequency channel;

wherein the processor configured to determine the frequency channel comprises:

calculating a location, wherein the $$location = OneOrder_{station} \text{ modulo } N,$$

wherein $OneOrder_{station}$ is the abbreviated identifier of the station, and N is a number of frequency channels in the pool; and selecting a frequency channel indicated by the location as the determined frequency channel.

9. The station of claim 8, wherein the trigger frame further includes timing information, and wherein the processor is configured to determine the frequency channel in the pool in accordance with the timing information.

10. The station of claim 8, wherein a plurality of potentially transmitting stations are indicated in the paging bitmap.

11. The station of claim 8, wherein the processor is configured to determining a size of the pool of frequency channels in accordance with a number of stations in a plurality of potentially transmitting stations as indicated in the paging bitmap.

12. A method for communicating in a wireless system, the method comprising:

transmitting, by an access point, a trigger frame including a paging bitmap, timestamp information of the trigger frame and resource allocation information, the resource allocation information indicating a pool of frequency channels, wherein the paging bitmap comprises information indicating a plurality of potentially transmitting stations;

determining, by the access point, a plurality of frequency channels in the pool in accordance with both the timestamp information and identifiers of the stations in the plurality of potentially transmitting stations;

calculating a location, wherein the $$location = OneOrder_{station} \text{ modulo } N,$$

wherein $OneOrder_{station}$ is an abbreviated identifier of a station of the plurality of potentially transmitting stations, and N is a number of frequency channels in the pool; and receiving, by the access point, at least one packet on a frequency channel indicated by the location, wherein a packet of the at least one packet comprises the abbreviated identifier of the station in the plurality of potentially transmitting stations.

13. The method of claim 12, further comprising determining a size of the pool of frequency channels in accordance with a number of stations in the plurality of potentially transmitting stations.

14. An access point comprising:

a transmitter configured to transmit a trigger frame including a paging bitmap, timestamp information of the trigger frame and resource allocation information, the resource allocation information indicating a pool of frequency channels, wherein the paging bitmap comprises information indicating a plurality of potentially transmitting stations;

a processor operatively coupled to the transmitter, the processor configured to determine a plurality of frequency channels in the pool in accordance with both the timestamp information and identifiers of the stations in the plurality of potentially transmitting stations;

calculation a location wherein the $$location = OneOrder_{station} \text{ modulo } N,$$

wherein $OneOrder_{station}$ is an abbreviated identifier of a station of the plurality of potentially transmitting stations, and N is a number of frequency channels in the pool; and a receiver operatively coupled to the processor, the receiver configured to receive at least one packet on a frequency channel indicated by the location, wherein a packet of the at least one packet comprises the abbreviated identifier of the station in the plurality of potentially transmitting stations.

15. The access point of claim 14, wherein the processor is configured to determine a size of the pool of frequency channels in accordance with a number of stations in the plurality of potentially transmitting stations.

16. The access point of claim 14, wherein the abbreviated identifier comprises a location of a bit corresponding to the station in the plurality of potentially transmitting stations.

17. The method of claim 12, wherein the abbreviated identifier comprises a location of a bit corresponding to the station in the plurality of potentially transmitting stations.

* * * * *